Figure 8:
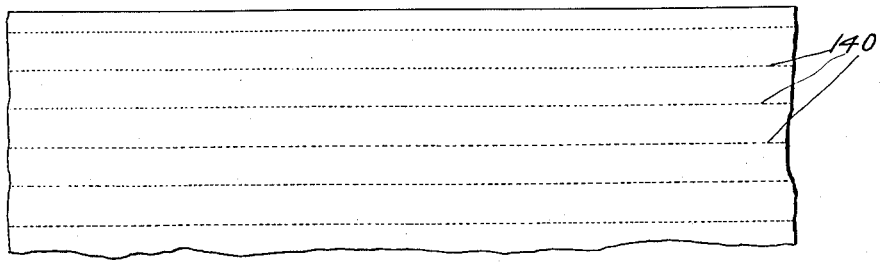

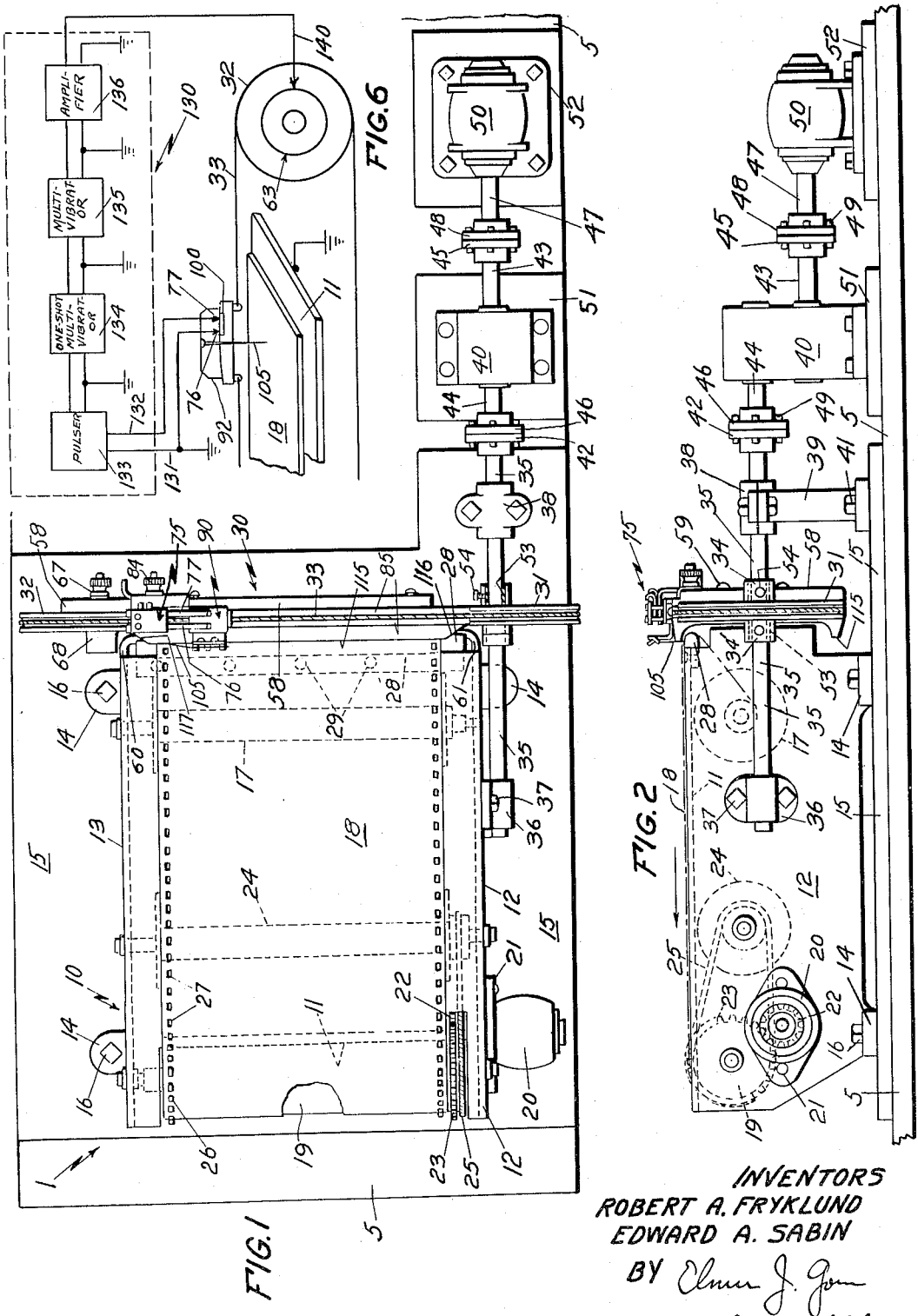

Nov. 15, 1955   R. A. FRYKLUND ET AL   2,723,462
GEAR ANALYZERS
Filed May 23, 1952   4 Sheets-Sheet 2
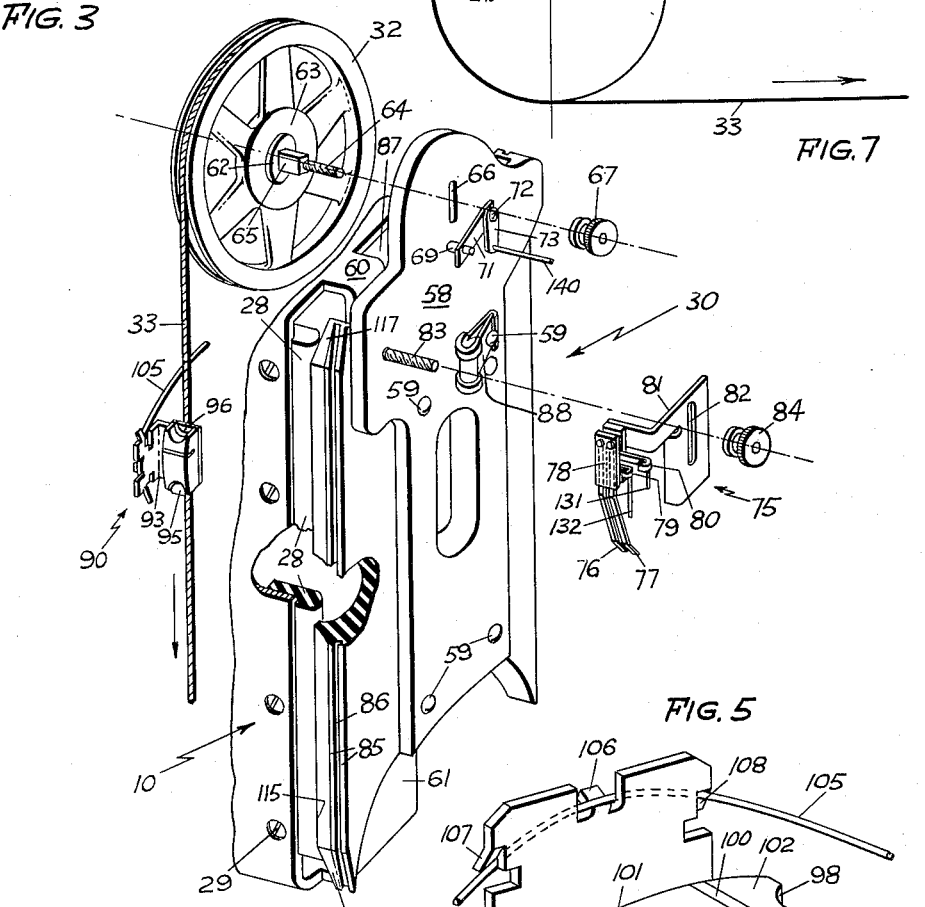
INVENTORS
ROBERT A. FRYKLUND
EDWARD A. SABIN
BY Elmer J. Gorn
ATTORNEY Nov. 15, 1955  R. A. FRYKLUND ET AL  2,723,462
GEAR ANALYZERS Filed May 23, 1952  4 Sheets-Sheet 4

INVENTORS
ROBERT A. FRYKLUND
EDWARD A. SABIN
BY Elmer J. Gorn
ATTORNEY

United States Patent Office 2,723,462
Patented Nov. 15, 1955

2,723,462
GEAR ANALYZERS

Robert A. Fryklund, Dedham, and Edward A. Sabin, Mansfield, Mass., assignors to Raytheon Manufacturing Company, Newton, Mass., a corporation of Delaware Application May 23, 1952, Serial No. 289,486

11 Claims. (Cl. 33—179.5)

This invention relates to a gear analyzer and, more particularly, relates to a means for investigating gear trains to determine whether or not imperfections or irregularities exist therein.

The gear analyzer, according to the invention, includes a record chart which is driven at constant speed over a platform or platen. A recording element is fastened to a movable member, which may be a belt engaging a pair of pulleys, one of which acts as a driving pulley and includes a shaft portion. The output shaft of the gear train or assembly to be analyzed is mechanically coupled to the driving pulley shaft. The input shaft of the gear assembly is connected mechanically to a drive means, such as a synchronous motor, running at constant speed. The recording element includes a stylus which repeatedly passes across the record chart with a linear velocity, which is a function of the angular velocity of the driving pulley, which, in turn, is a function of the angular velocity of the particular gear assembly being analyzed. At the instant the stylus passes a zero line at one edge of the recording chart, a means is actuated, enabling said stylus to produce a series of marks on the record chart which are spaced in time by a predetermined amount.

If the gear assembly is free of irregularities, the angular velocity of the gear assembly and driving pulley will be constant as also will the linear velocity of the driven recording element. The aforesaid series of marks on the chart will be spaced in a manner which is so related to said predetermined time spacing as to give a desired indication on the chart. For instance, if the marks in said series are equally spaced in time, freedom from irregularity in the gear assembly will be indicated by a series of evenly spaced marks on said chart. On the other hand, if the marks in said series are equally spaced in time, but the gear assembly is faulty, the driving pulley will be driven at varying velocity and the marks on the chart will be unevenly spaced. As the chart progresses, a series of dotted lines will appear on the chart which will be indicative of certain characteristics of the gear assembly being analyzed.

By making the length of the belt either slightly greater than or slightly less than an integral multiple of the circumference of the driving pulley, a small sector of the driving pulley and, hence, of the gear assembly will be analyzed during each series of marks produced for each revolution of the belt. The breadth of said sector is dependent upon the amount of deviation of the belt length from an integral multiple of the driving pulley circumference. After a sufficient number of complete revolutions of the belt, the entire periphery of the driving pulley, corresponding to one complete revolution of the gear assembly, will be scanned. The process is then repetitive and, as soon as a second cycle is observed on the chart, the gear assembly, if shown by the chart to be defective, may be removed for examination of defects and another gear assembly inserted.

The objects and advantages of this invention will be apparent as the description thereof progresses, reference being had to the accompanying drawings, wherein:

Fig. 1 is a plan view of the gear analyzer showing the chart rolls, chart drive belt and nose piece in dotted lines;
Fig. 2 is a side view of Fig. 1;
Fig. 3 is an exploded isometric view showing portions of a recording assembly;
Fig. 4 is a detail of a portion of the recording assembly of Fig. 3;
Fig. 5 is an enlarged view of a stylus assembly;
Fig. 6 is a block diagram of the electrical circuit for producing marks on the chart;
Fig. 7 is a view illustrating certain principles of operation of the subject invention; and
Figs. 8 to 12 are views showing portions of marked charts for providing analysis of typical gear assemblies.

Referring to Figs. 1 and 2 of the drawings, the gear analyzer comprises a recording assembly 1 including a platen assembly 10 in the form of a sheet of electrically conducting material, such as steel or aluminum alloy, which has a horizontal planar surface or platen 11 and flanges 12 and 13 bent at right angles thereto. Tabs 14 disposed rectangularly to the flanges 12 and 13 may be fastened to a base 15 by bolts 16 or other appropriate fastening devices. Platen assembly 10 also includes end portions 60 and 61, which are shown more clearly in Fig. 3, to be described later.

A freely turning supply roll 17, on which unused chart paper 18 is wound, is mounted underneath platen 11 near one end thereof between flanges 12 and 13. A drive roll 19 is mounted between flanges 12 and 13 at the opposite end of the platen assembly from supply roll 17. A small motor 20 is mounted on flanges 12 by bolts 21 and is adapted to rotate drive roll 19 through a pinion 22 attached to the motor shaft and a gear 23, either forming an integral part of drive roll 19 or mounted coaxially with roll 19 and fastened to the end of said roll by appropriate means. A take-up roll 24 is mounted between flanges 12 and 13 of platen assembly 10 between supply roll 17 and drive roll 19.

An endless belt 25 in the form of a coil spring passes over the corresponding ends of both drive roll 19 and take-up roll 24 so that the latter is driven by motor 20. Sufficient tension on belt 25 is furnished by the spring structure to insure that the take-up roll will be driven and that the chart paper will not be torn. Drive roll 19 is furnished at both ends with sprockets 26 which mesh with sprocket holes 27, located along both edges of the chart paper to advance the paper from right to left, as viewed from the top of the platen assembly. Motor 20 may be a conventional fractional horsepower motor, such as a synchronous clock motor, whose speed is maintained constant; in this way the rate of travel of chart paper 18 is constant. The chart paper 18 passes from supply roll 17 over an electrically non-conductive nose piece 28 attached to the right-hand edge of platen assembly 10 by a plurality of screws 29, and finally over drive roll 19 to take-up roll 24.

The combined stylus and switch assembly 30, which includes a switch assembly 75 and stylus assembly 90, to be described subsequently, comprises a pair of grooved electrically conductive pulleys 31 and 32 driven by an endless electrically conductive belt 33, such as a steel cable. An insulating bushing 53 is interposed between both hubs 34 and 34' and shaft 35 of pulley 31.

Pulley 32 is adjustably mounted on a rigid electrically insulating support 58 in a manner to be more clearly shown later. Pulley 31 is journaled on shaft 35 by means of bearing 36 attached by bolts 37 to flange 12 of the platen assembly. Locking screws 54 in the hubs of pulley 31 serve to rigidly attach pulley 31 to shaft 35. A portion of shaft 35 extends through bearing 38, supported by bearing support 39, in turn securely fastened to base 15 by fastening device 41. A flanged portion 42 is keyed to shaft 35. Shaft 35 of pulley 31 is driven through a gear assembly 40 to be analyzed by means of the constant speed motor 50 which may be mounted on a base portion 52. The input and output shafts 43 and 44, respectively, of gear assembly 40 have flanges 45 and 46, respectively, keyed thereto, as shown in Figs. 1 and 2. The motor shaft 47 also has a flange 48 keyed thereto. Flanges 45 and 46 of gear assembly 40 are connected to flanges 48 and 42, respectively, by bolts 49 or other fastening means. Gear train 40 may be mounted on a base or jig 51 to provide rigidity and freedom from vibration. Although it is possible to eliminate either bearing 36 or bearing 38 to simplify the apparatus, the use of two bearings provide better support for shaft 35 and insures a minimum of vibration or wobbling of the pulley and shaft and better alignment of pulley shaft and gear assembly output shaft. The base portions 15, 51 and 52 may be placed on a common base or work bench 5, as shown in Figs. 1 and 2. The levels of bases 15, 51 and 52 may, of course, be adjusted by shims or other conventional means in order to align the flanges 42 and 46 and flanges 45 and 48, respectively.

Referring now to Fig. 3, an electrically insulating support 58, such as a Bakelite molding, serves as a support for stylus and switch assembly 30 and is fastened to the ends 60 and 61 of platen assembly 10 by means of bolts 59. A small boss (not shown) is provided on the inner surface of support 58 adjacent each bolt 59 so that the body portion of support 58 is spaced a short distance from the ends 60 and 61 of platen assembly 10. Pulley 32 is mounted on a bearing (not shown) whose housing 62 projects beyond hub 63 of said pulley. A bolt 64 is threaded at one end and has a flat portion 65 next to housing 62. A slot 66 is provided in the upper part of support 58 into which the flat portion 65 of bolt 64 slidably fits. A knurled nut 67 is screwed over the threaded end of bolt 64 and clamps bearing housing 62 firmly to support 58 so that pulley 32 may rotate freely and be adjustable in position in slot 66 with respect to pulley 31 in order to adjust the tension of belt 33.

A portion of end 60 of platen assembly 10 is cut away at 87 in Fig. 3 to provide room for hub 63 of pulley 32 when the latter is in operative position. The hub 63 of pulley 32 provides a smooth flat surface adjacent support 58. An electrically conductive brush 69 inserted in hole 70 in support 58 maintains contact with the surface of hub 63 by a flat leaf spring 71 fastened at one end to support 58 by means of screw 72, as shown in detail in Fig. 4. A lug 73, also held in position by screw 72, serves as an electrical connector to brush 69. A lead wire 140 has one end soldered to lug 73 and the other connected to the output of a trigger circuit to be described later. As shown in Fig. 4, spring 71 has a hole at one end through which the reduced outer end of brush 69 passes, thus providing a shoulder against which spring 71 applies the force necessary to maintain brush 69 in contact with hub 63 of electrically conductive pulley 32.

Referring again to Fig. 3, a keying switch assembly 75 is also attached to support 58 and comprises a pair of electrical contacts 76 and 77 connected in an electrically insulating block 78 and provided with lugs 79 and 80, respectively. Block 78 is attached to a bracket 81 which contains a slot 82 which encompasses a threaded bolt 83 carried by support 58. A hand nut 84 is screwed over bolt 83 to hold bracket 81 fixed to support 58. A clamp 88, mounted on support 58 by one of bolts 59, secures electrical leads 140, 132 and 131, which are connected to lugs 73, 79 and 80, respectively.

Stylus assembly 90, shown in detail in Fig. 5, is fixedly connected to belt 33. A metallic bracket 93 is made of a thin sheet of metal, such as stainless steel, bent to form a base portion 91 and a side portion 92 at right angles thereto. Wire belt 33 is connected directly to base portion 91 by any desired means, such as by soldering.

A prismoidal block 94 of electrically insulating material and of long wearing quantities, such as nylon, is mounted in base portion 91 of bracket 93. A pair of extensions 95 and 96 of bracket base 91 (only one of which is visible in Fig. 5) is bent up and over indented portions 97 and 98, respectively, of block 94 to clamp the latter firmly to base 91 of bracket 93. The upper surface of block 94 is convex having a long sloping surface 101 and a shorter sloping surface 102. Between the sloping surface at the top of block 94, a bar or insert 100 of electrically conductive material, such as copper, is inserted in cross-wise fashion in block 94 with its top surface flush with the top surface of block 94. The direction of motion of belt 33 owing to the rotation of the pulleys is as shown by the arrow in Figs. 3 and 5. The side portion 92 of bracket 93 is provided with three lugs 106, 107 and 108 which are struck out from 92 and bent outwardly, as viewed in Fig. 5. Lugs 107 and 108 are directed downwardly while lug 106 is upwardly directed. A stylus 105, which may be a relatively stiff electrically conductive wire, such as tungsten, is looped over central lug 106 and under the end lugs 107 and 108. In this way, the stylus wire may be easily inserted and removed from its support and is maintained at the proper angle for sliding smoothly along chart 18.

Referring again to Fig. 3, a platform 85 containing a groove 86 in which belt 33 slides as it passes between pulleys 31 and 32 is an integral part of support 58 and extends at right angles to the main body thereof along both lengthwise edges. Platform 85, in addition to guide assembly 99 and switch assembly 75, also carries a straight edge 115 which is positioned in the path which would normally be followed by stylus 105 in passing between pulleys 31 and 32 and traversing chart 18. The end portions 116 and 117 of straight edge 115 are sloped back toward the main body of support 58. Thus, as can be seen in Fig. 1, stylus 105 approaches the upper sloping edge 117 and is thereby deflected from the path it normally tends to follow and is made to follow straight edge 115. This causes the stylus to follow an accurate straight path across chart 18 so that the successive marks, shown in Figs. 8 to 11, made by the stylus on the chart are evenly spaced.

The deflection of the stylus from its normal path by straight edge 115 does not pull the stylus assembly 90 laterally out of its normal path since the groove 86 restrains belt 33 against such lateral movement. Furthermore, this deflection of the stylus does not cause stylus assembly 90 to wobble on platform 85 since the latter is elevated above a line of tangents of the two pulleys so that assembly 90 is held tightly to the platform by tension on belt 33. This tension can be varied by means of hand nut 67. This tension also assures a uniform bearing of stylus 105 on chart 18 as it travels along and, consequently, uniform density of markings.

As pulley 31 is rotated, the stylus makes repeated traversals of record chart 18 with each traversal bringing the stylus first in contact with electrically insulating nose piece 28 connected to platen assembly 16. Since, as will be pointed out subsequently in more detail, stylus 105, record paper 18 and platen 11 are part of an electrical circuit, if nose piece 28 were electrically conductive and a voltage appeared between stylus and platen at the instant the stylus comes in contact with nose piece 28 and prior to the instant at which it arrives on chart 18, sparking at the tip end of stylus 105 might cause the latter to become welded to the platen. The electrically conductive record chart 18 is sufficiently conductive to provide an electrical extension of the platen to the point of contact with the stylus.

Referring now to Fig. 6, during each revolution of belt 33 over the pulleys, the electrically conductive bar 100 momentarily bridges keying contacts 76 and 77.

The instant of bridging and hence the zero position on record chart 18 are adjustable by means of slot 82 and hand nut 84, shown in Fig. 3. Leads 131 and 132 are connected to the input of the pulse-trigger circuit 130 which includes a pulser 133, a one-shot multivibrator 134, a multivibrator 135 and amplifier 136, in that order.

One side of circuit 130 and the stylus marking circuit, including platen 11, is preferably grounded in order to minimize the possibility of shock and to conform to general practice in circuit wiring. Contacts 76 and 77 serve as a mechanical switch which is normally open. At the instant of bridging of contacts 76 and 77 by bar 100, the switch is momentarily closed. This closure causes a pulse to be produced by pulser 133. The latter may be of many types well known to those skilled in the art and a detailed description is deemed unnecessary; the pulser may, for example, be a conventional line type pulser such as described in sections 10.7 to 10.10 on pages 356 to 383 of "Radar System Engineering" by Ridenour, first edition, 1947, McGraw-Hill Book Company, Inc.

The output pulse from pulser 133 is applied to a conventional one-shot multivibrator 134 to produce a pulse of duration approximately equal to the average time required for the stylus assembly to be carried from one edge of the chart to the other. The output of multivibrator 134 is then applied to free-running multivibrator 135 which produces a series of equally-spaced pulses during the duration of the pulse from multivibrator 134. For example, the circuit constants of multivibrator 135 may be adjusted so that it produces six pulses during one pulse from multivibrator 134. It should be realized, however, that any reasonable number of pulses may be produced by multivibrator 135, depending on the number of marks desired per scan. The pulses arriving from multivibrator 135 are amplified by power amplifier 136 and these amplified pulses are conducted along a path including lead 140, lug 73, spring 71, brush 69, hub 63 of pulley 32, belt 33, portion 93 of stylus assembly 90, stylus 105, electrically conductive paper 18, platen 11 and ground, in that order.

The current passing through electrically conductive paper 18 causes a chemical reaction in said paper at the point at which the stylus contacts the paper, leaving a black mark or dot at said point. Each time an electrical pulse is produced at the output of pulse-trigger circuit 130, a mark is produced on chart paper 18. For each passage of bar 100 of stylus assembly 90 past keying contacts 76 and 77 of switch assembly 75, that is, for each traversal of the stylus past the zero line of the chart, a series of six vertically arranged dots is produced on chart 18. As the stylus makes repeated traversals of the chart, a plurality of said series of dots or marks appear thereon. The rate of chart feed may be adjusted so that the advance for a single stylus scan (traversal of chart) is equal to the width of the mark so that a solid line is formed on the chart. Since the marks are approximately .010 inch in size, the speed of motor 20 would then be adjusted so that the paper moves at a rate of .010 inch per stylus scan. It is not necessary, of course, to produce a solid line; if the marks are closely enough spaced, a satisfactory dotted line may be produced, as shown in Figs. 8 to 12.

Referring to Fig. 7, if stylus 100, represented at point $s$, in passing the position of keying contacts 76 and 77, represented as $k$, is allowed to trigger a circuit which will feed back a signal to belt 33 a fixed time later, the position of point $s$ when the signal returns (zero point on chart), represented as $s_0$, will depend on the linear velocity of the belt. The return signal, which as previously stated, is made up of six pulses, will place a series of six dots on the chart paper which will be a true indication of the average linear velocity of the belt from point $s_0$ to some point $s_1$, and thus the angular velocity of pulley 31 within a given arc. Since the length $l$ of belt 33 is not exactly an integral multiple of the circumference $a$ of the driving pulley, but is given by $l=na+\Delta a$ where $n$ is an integer, for every complete revolution of belt 33, point $s$ and a point $m$ on the periphery of pulley 31 will be displaced by $\Delta a$. If, at the start of a given period of rotation, points $s$ and $m$ are in coincidence, as shown by $s'$ and $m'$, the next rotation of belt 33 will find point $m$ lagging point $s$, as shown by $s'$ and $m''$, by an amount $\Delta a$, provided $l$ is greater than $na$; if $l$ is less than $na$, point $s$ will lead point $m$ by $\Delta a$. Similarly, for the condition $l>na$, during the following rotation of the belt 33, point $s$ will lag point $m$ by an amount $\Delta a'$ equal to $2\Delta a$, as shown by $s'$ and $m'''$, and so on. The point $s$ thus represents a different angular portion of pulley 31 each time it passes trigger point $k$ and the successive traversals of point $k$ are $$\frac{\Delta a}{2\pi}$$

radians removed. The number of revolutions of point $m$ about its axis before coincidence between the points $s$ and $m$ is again established is equal to the fraction $$\frac{na+\Delta a}{\Delta a}$$

Since the gear assembly 40 is driving pulley 31, each triggered return signal will scan different portions or sectors of the gear assembly. For instance, a complete tooth may be scanned over a certain number of revolutions of belt 33. The resulting plot on the chart paper is an integration of the instantaneous velocity occurring on the gear assembly and reads in units of displacement, which is the most useful measurement of gear tooth action.

The accuracy of the gear analyzer will be improved if the pulleys take the form of sprocket wheels and the belt is perforated, having a number of holes equal to a multiple of the number of teeth on the sprocket plus or minus a small number of holes corresponding to the value of $\Delta a$ desired. For example, a sprocket wheel having 300 teeth and a belt having 301 engaging holes may be used for scanning the gear undergoing analysis.

The gear assembly 40 being analyzed serves to transfer the motion of uniform angular velocity of motor 50 to drive pulley 31. If gear train 40 is satisfactory, the uniform angular motion of motor 50 is transferred to drive pulley 31. Since pulley 31 is moving at constant angular velocity throughout, the belt 33 and the stylus 105 are caused to move along straight edge 115 at a constant linear velocity. Inasmuch as the six pulses from the circuit 130 are equally spaced, the stylus will pass current when it has attained points along chart 18 which are equidistant. Consequently, a record, as shown in Fig. 8, is produced comprising a series of equally-spaced substantially parallel lines 140. If, however, gear assembly 40 is defective, the various lines on the chart will deviate from the regular pattern illustrated in Fig. 8.

Figure 9:
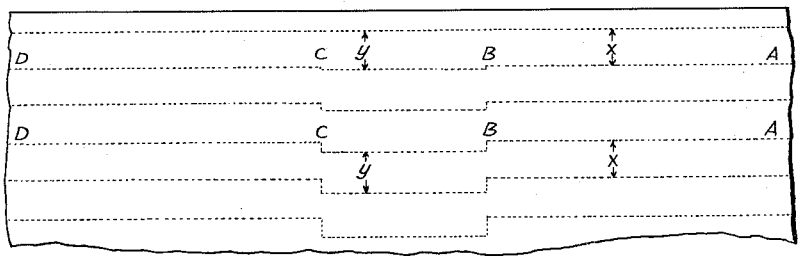

Fig. 9 shows the effect of changes in input speed to a satisfactory gear assembly. Although motor 50 is normally adapted to run at substantially constant speed, it is possible to use a driving means whose speed may not always remain constant. The type of record obtained when there are fluctuations in speed of the driving means is illustrated in Fig. 9. In the region AB of the chart, motor 50, which is supplying the reference speed, is running at a certain constant speed. The distance between adjacent marks is shown as $x$. At point B, the motor has speeded up, as shown by the increased distance $y$ between the marks for equal time intervals. During the entire interval BC, the motor speed remains constant at its new value and the output shaft of gear assembly 40 is driven at a constant angular velocity for what may be several hundred revolutions of the motor. At C the motor speed has reverted to its original speed and remains at that speed over the remaining portion CD of the chart. If motor 50 had slowed down instead of speeded up in region BC, the intervals $y$ would have been less than, rather than greater than, the normal intervals indicated as $x$.

Figure 10:
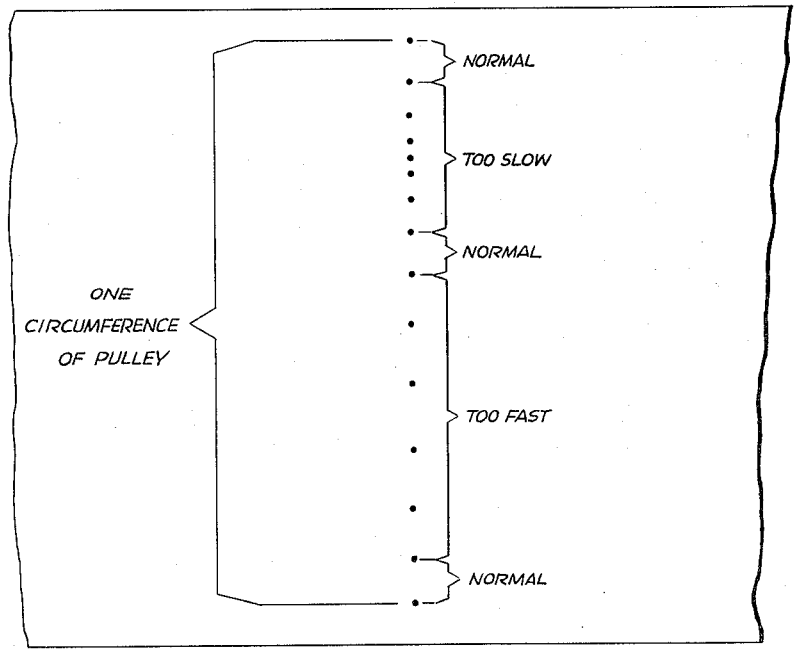

Fig. 10 indicates a typical record produced when gear assembly 40 is such that the movement transferred from constant speed motor 50 to pulley 31 is no longer one of constant angular velocity. The condition shown in Fig. 10 is illustrative of an eccentric gear box output shaft gear. Such an eccentric gear will cause an increase and a decrease of angular velocity for each revolution of the output gear and driving pulley. If the chart width is made equal to the circumference of the driving pulley, then each revolution of the output shaft gear will cause the stylus to traverse the chart just once; the pattern resulting from one such revolution of the eccentric output gear is shown in Fig. 10. The interval between the first two successive marks corresponds to the normal speed, as clearly labeled in Fig. 10. Because of the eccentricity of the output gear, the latter begins to slow down, as shown by the region of successively more closely spaced marks. The gear next returns to the normal speed and then commences to travel at an angular velocity greater than normal, as shown by the region of marks spaced successively farther apart. Finally, the gear begins to decelerate to the normal speed and the cycle repeats for the next complete traversal of the eccentric output shaft gear.

Figure 11:
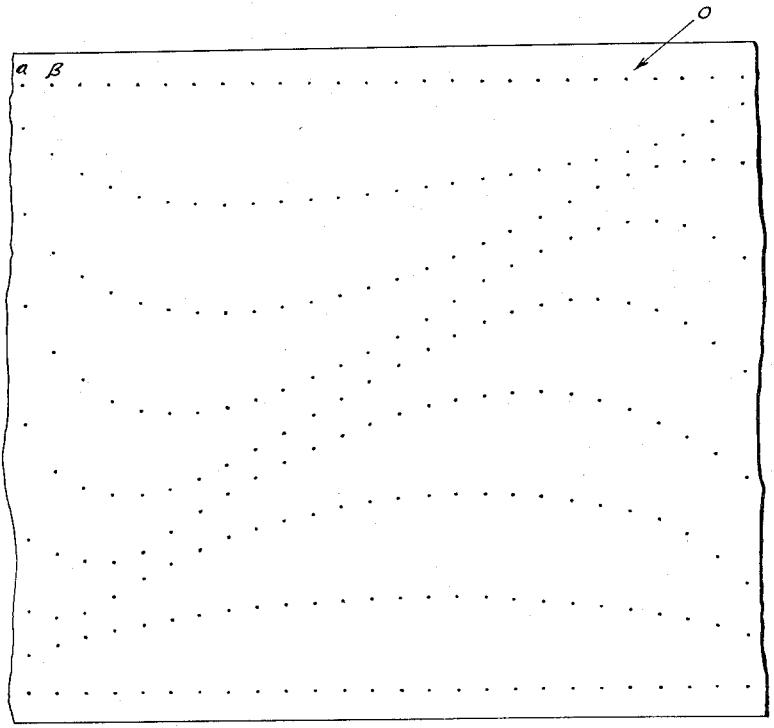

Fig. 11 is a typical recording illustrating the condition of eccentricity shown in Fig. 10 taken over a period of time. For purposes of illustration, a portion of a chart equal to one complete scanning of the driving pulley is shown. As in Fig. 10, the chart width is equal to one circumference of the driving pulley and twenty-six increments $\Delta a$ are required for one complete circumference of the pulley; that is, $26\Delta a$ equals one circumference. The portions of the marks on the chart for the twenty-six successive traversals (revolutions plus or minus $\Delta a$) of the stylus is as shown in Fig. 11. The first scan or traversal is represented by the substantially vertical rows of marks beneath the reference letter $a$, the second scan by the vertical row of marks beneath the letter $\beta$, and so forth. Each corresponding mark in scan $\beta$ other than those in the zero line 0 are spaced $\Delta a$ in time above or below (as the case may be) the corresponding mark in the row below letter $a$, and so forth. The region of crowded marks migrate substantially diagonally across the chart paper as the latter progresses normal to the movement of the stylus because of the factor $\Delta a$ by which each scan of the stylus differs from the preceding one. It should be understood that the number of scans made for a complete revolution of the driving pulley may be any desired number. The smaller the value of $\Delta a$, the more accurate analysis may be made of the gear assembly undergoing test.

Figure 12:
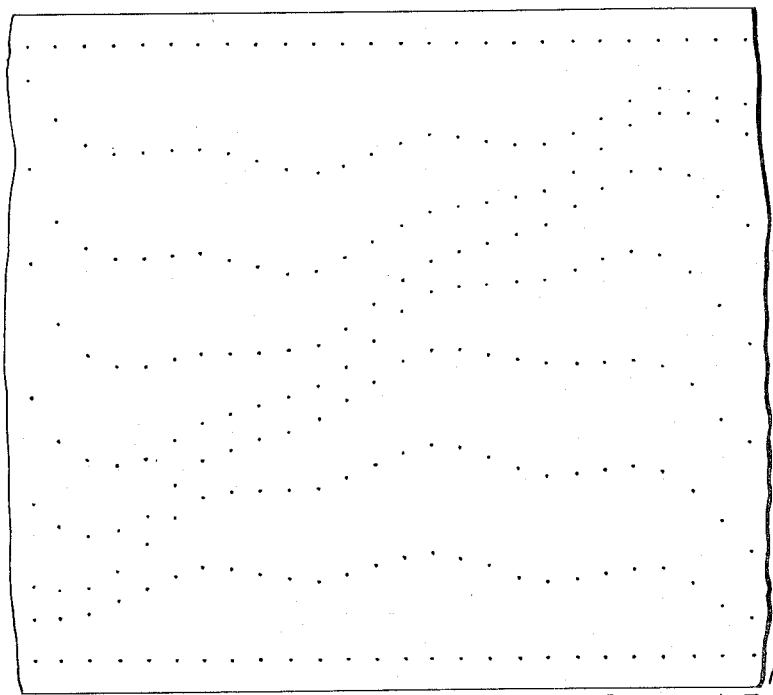

Fig. 12 illustrates the condition of eccentricity in the gear next to the output gear. If this gear is smaller than the output gear, it makes more revolutions per minute than the output gear, and its substantially sinusoidal variations, when transferred through the output shaft gear to the driving pulley, results in a chart pattern as shown in Fig. 12.

By judicious use of charts such as those of Figs. 8 to 12, it is possible to analyze gear assemblies not only for the presence of defects, but also to determine the type and general location of any defects.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A gear analyzer comprising a recording medium adapted to be driven at a predetermined constant speed, a gear assembly to be analyzed, a driving means operating at a predetermined constant speed and connected to said gear assembly for effecting rotation thereof, a recording element cooperating with said recording medium, motive means connected to said gear assembly for causing said recording element to recurrently traverse said recording medium as a function of the angular velocity of said gear assembly, means including an electrical pulsing circuit energized during each traverse of said recording element past said recording medium for producing thereon a plurality of marks at a constant repetition rate, the position of each of said marks on said recording medium being dependent upon the instantaneous angular velocity of said gear assembly and the arrangement of said marks being indicative of the degree of regularity of said gear assembly.

2. A gear analyzer comprising a recording medium adapted to be driven at a predetermined constant speed, a gear assembly to be analyzed, a driving means operating at a predetermined constant speed and connected to said gear assembly for effecting rotation thereof, a recording element cooperating with said recording medium, motive means connected to said gear assembly for causing said recording element to recurrently traverse said recording medium along a substantially rectilinear path as a linear function of the angular velocity of said gear assembly, means including an electrical pulsing circuit energized during each traverse of said recording element past said recording medium for producing thereon a plurality of marks at a constant repetition rate, the position of each of said marks on said recording medium being dependent upon the instantaneous angular velocity of said gear assembly and the arrangement of said marks being indicative of the degree of regularity of said gear assembly.

3. A gear analyzer comprising a record chart adapted to be driven at a predetermined constant speed along a first path, a gear assembly to be analyzed, a driving means operating at a predetermined constant speed and connected to said gear assembly, a recording element cooperating with said recording chart, means connected to said gear assembly for causing said recording element to recurrently traverse said recording chart along a rectilinear path normal to said first path as a linear function of the angular velocity of said gear assembly, means including circuit means energized during each traverse of said recording element past said record chart for producing thereon a plurality of marks at a constant repetition rate, the position of each of said marks on said record chart being dependent upon the instantaneous angular velocity of said gear assembly and the arrangement of said marks being indicative of the degree of regularity of said gear assembly.

4. A gear analyzer comprising a record medium adapted to be driven at a predetermined constant speed, a gear assembly to be analyzed, a driving means operating at a predetermined constant speed and connected to said gear assembly, a recording element cooperating with said record medium, means connected to said gear assembly for causing said recording element to recurrently traverse said recording medium as a function of the angular velocity of said gear assembly, circuit means responsive to each traverse of said recording element past a given portion of said record medium for producing a plurality of electrical pulses of constant repetition rate, and further means responsive to said pulses for producing marks on said medium whose position thereon is dependent upon the angular velocity of said gear assembly at the instant of production of said pulses, the arrangement of said marks on said record medium being indicative of the degree of regularity of said gear assembly.

5. A gear analyzer comprising a record medium adapted to be driven at a predetermined constant speed, a gear assembly to be analyzed, a driving means operating at a predetermined constant speed and connected to said gear assembly, a recording element cooperating with said record medium, means connected to said gear assembly for causing said recording element to recurrently traverse said recording medium along a substantially rectilinear path at a rate directly proportional to the angular velocity of said gear assembly, circuit means responsive to each traverse of said recording element past a given portion of said record medium for producing a plurality of electrical pulses of constant repetition rate, and further means responsive to said pulses for producing marks on said medium whose position thereon is dependent upon the angular velocity of said gear assembly at the instant of production of said pulses, the arrangement of said marks on said record medium being indicative of the degree of regularity of said gear assembly.

6. A gear analyzer comprising a recording device having an electrically conductive stylus, an electrically conductive platen and an electrically conductive recording medium positioned therebetween, means for moving said recording medium at constant speed over said platen, means for driving said stylus repeatedly across said recording medium including an electrically conductive pulley, a driving pulley, an endless electrically conductive belt in operative engagement with said pulleys and of length differing slightly from an integral multiple of the circumference of said driving pulley, an electrically conductive holder for said stylus fastened to said belt, and a constant speed prime mover, a gear assembly to be analyzed and adapted to be connected mechanically between said prime mover and said driving pulley, electrical keying means including contacts adapted to cyclically contact said holder, pulse forming means responsive to said keying means for producing a series of electrical pulses having a predetermined spacing, circuit means including said means for driving for marking said recording medium in response to said pulses, thereby producing a record indicative of irregularities in said gear assembly.

7. A gear analyzer comprising a recording device having an electrically conductive stylus, an electrically conductive platen and an electrically conductive record paper therebetween, said stylus being arranged to be moved repeatedly across said record paper to produce marks thereon in response to electrical pulses, means for moving said record paper at constant speed over said platen along a first path, an electrically conductive pulley, a driving pulley, an endless electrically conductive belt in operative engagement with said pulleys and of length differing slightly from an integral multiple of the circumference of said driving pulley, a stylus holder having an electrically conductive portion fastened to said belt, a driving assembly comprising a drive motor and a gear assembly to be tested, said gear assembly being adapted to be connected mechanically between said drive motor and one of said pulleys, said belt being adapted to move along a second path normal to said first path upon energization of said driving assembly, said stylus holder having a block of insulating material mounted thereon, an electrically conductive bar inserted in said block, a flexible electrical contact member fixedly arranged with respect to said moving belt and adapted to trigger an electric circuit productive of a series of current pulses of predetermined spacing when said bar engages said contact member, electric circuit means including the aforesaid electrically conducting pulley, belt, stylus holder, stylus, record paper and platen for marking said record paper at the point at which said current pulses flow therethrough, said marked record paper being indicative of irregularities existing in said gear assembly.

8. A gear analyzer comprising a recording medium arranged to be driven at a predetermined constant speed, a gear assembly to be analyzed, driving means operated at a predetermined constant speed and connected to said gear assembly for effecting rotation thereof, a recording element cooperating with said recording medium, motive means connected to said gear assembly and independent of the characteristics of said gear assembly for causing said recording element to recurrently traverse said recording medium as a function of the angular velocity of said gear assembly, means including an electrical pulse circuit energized during each traverse of said recording element past said recording medium for producing thereon marks whose positions are dependent upon the angular velocity of said gear assembly at the instant of production of said pulses, the arrangement of said marks on said recording medium being indicative of the degree of regularity of said gear assembly.

9. A device for analyzing gears comprising an electrically conductive recording medium; means for moving said recording medium at constant speed along a first path; a gear assembly to be analyzed; driving means including a constant speed prime mover connected to said gear assembly for effecting rotation thereof, a driving pulley connected to said rotating gear assembly, an electrically conductive pulley, and an electrically conductive belt in operative engagement with said pulley and moving along a path normal to said first path at a rate proportional to the angular velocity of said gear assembly; an electrically conductive recording element affixed to said movable belt and recurrently traversing said recording medium, pulse forming means operable during each traversal of said recording element across said recording medium for producing a set of electrical pulses equally spaced in time; and means responsive to each set of said pulses and including said recording element and driving means for producing a linear array of marks on said recording medium whose spacing is indicative of the degree of regularity of said gear assembly.

10. A device for analyzing gears sector by sector comprising an electrically conductive recording medium; means for moving said recording medium at constant speed along a first path, a gear assembly to be analyzed; driving means including a constant speed prime mover connected to said gear assembly for effecting rotation thereof, a driving pulley connected to said rotating gear assembly, an electrically conductive pulley, and an electrically conductive belt in operative engagement with said pulleys and movable along a path normal to said first path at a rate proportional to the angular velocity of said gear assembly, said belt having a length differing from an integral multiple of the circumference of said driving pulley by an amount determined by the breadth of said sector; an electrically conductive recording element fixedly attached to said movable belt and recurrently traversing said recording medium; pulse forming means operable during each traversal of said recording element across said recording medium for producing a set of electrical pulses equally spaced in time; and means responsive to each set of said pulses and including said recording element and said driving means for producing a linear array of marks on said recording medium whose spacing is indicative of the degrees of regularity of a corresponding sector of said gear assembly.

11. A gear analyzer comprising a recording medium adapted to be driven at a predetermined constant speed, a gear assembly to be analyzed sector by sector, a driving means operating at a predetermined constant speed and connected to said gear assembly, a recording element cooperating with said recording medium, motive means including a pair of pulleys and an endless belt cooperating with said pulleys and having a length differing from an integral multiple of the circumference in at least one of said pulleys by an amount dependent upon breadth of said sector, said motive means directly connected to said gear assembly for causing said recording element to recurrently traverse said recording medium as a linear function of the angular velocity of said gear assembly, means responsive to each traverse of said recording element past a given portion of said recording medium for producing a set of electrical pulses of constant repetition rate, and further means responsive to each set of said pulses for producing an array of marks on said medium whose position thereon is dependent upon the angular velocity of a corresponding sector of said gear assembly, the arrangement of said sets of marks on said recording medium being indicative of the degree of regularity of a corresponding sector of said gear assembly.

References Cited in the file of this patent

UNITED STATES PATENTS

| | | |
|---|---|---|
| 1,282,348 | Wirrer | Oct. 22, 1918 |
| 1,483,419 | Eaton | Feb. 12, 1924 |
| 2,118,081 | Grisdale | May 24, 1938 |
| 2,305,264 | Leonard | Dec. 15, 1942 |
| 2,519,925 | Okuniew | Aug. 22, 1950 |
| 2,596,118 | Bischoff | May 13, 1952 |
| 2,597,199 | Stamper | May 20, 1952 |